Patented Feb. 4, 1936

2,029,966

UNITED STATES PATENT OFFICE 2,029,966

REAGENT FOR WATER PURIFICATION AND PROCESS FOR PRODUCING SAME

Oliver M. Urbain and William R. Stemen, Columbus, Ohio, assignors to Charles H. Lewis, Harpster, Ohio No Drawing. Application May 18, 1935, Serial No. 22,261

6 Claims. (Cl. 210—2)

This invention relates to a reagent for water purification and process for producing the same. More specifically the invention contemplates the provision of an efficient and economical reagent adapted for use in the removal of tastes and odors from potable waters and for use in the removal from polluted water of organic compounds, as well as dyes present therein in true solution.

At the present time active carbons are used for the purpose of removing tastes and odors from potable water. By potable water is intended to be meant water for domestic consumption by the inhabitants of a community. The powdered active carbon is usually added to the water prior to a conventional coagulation step and after the action of the active carbon is complete coagulation is effected for removal thereof along with other suspended matter. Aluminum sulfate and ferrous sulfate are suitable coagulants for the purpose.

The active carbons now used for such purposes are costly and frequently constitute an important part of the final costs of purification.

In so far as the treatment of potable waters is concerned, it is the object of the present invention to provide a treating reagent fully as efficient in use as the active carbons as well as one that can be prepared at a cost far less than that of even the cheapest active carbons.

With respect to the treatment of polluted waters to eliminate the biochemical oxygen demand, i. e., (B. O. D.) due to the presence of organic compounds in true solution, and to eliminate unsightly color due to the presence of dyes, it is the purpose of the invention to provide a reagent having an enormous capacity for such compounds.

The problem of removing dyes is most acute. The removal of the fluorescent dyes, such as the rhodamines, has in the past presented a very serious and difficult problem. It is possible however by use of the novel reagent of the present invention to effect their instantaneous and complete adsorption.

The novel reagent of the instant invention will also effect instantaneous and complete removal of the chlorophenols and the chlorocresols.

Specifically, the invention comprehends a novel nitrated oxidized carbonaceous material and process of producing same.

In the preparation of the nitrated oxidized carbonaceous material of the invention any of the following carbonaceous materials may be used, bituminous coal, anthracite coal, lignite, cannel coal, peat and coke.

The carbonaceous material selected is first finely powdered to say 10 to 50 mesh. It is then treated with any of the following reagents, concentrated nitric acid, dilute nitric acid, nitric acid and sulfuric acid, nitric acid and orthophosphoric acid, nitrous oxide and nitrogen dioxide.

The reaction employing the gaseous nitrous oxide and nitrogen dioxide is a dry reaction. The other reactions are wet reactions. The powdered carbonaceous material is treated with the reagent in excess. Gases and heat are evolved. The nitration and oxidation proceed simultaneously and the reaction is accelerated at high temperature under superatmospheric pressure. Catalysts may also advantageously be employed. Suitable catalysts for the purpose being the ferric and mercuric salts. During the reaction an inert gas may advantageously be passed through the mass to carry off the gaseous reaction products.

The time required to complete the reactions is somewhat variable, six hours is however adequate and shorter periods will be found satisfactory where the concentration of nitric acid in the reagent is relatively high. Completion of the reaction is evidenced by the cessation in the evolution of gases.

The chemical actions which take place are extremely complex since both a nitration and an oxidation occur simultaneously. It is our belief that the nitric acid treatment of the carbonaceous material results in the following chemical and physical changes in the material.

1—Nitro groups are introduced into the material.

2—Some inorganic constituents are oxidized and removed as soluble salts.

3—Certain inorganic constituents are oxidized and rendered chemically active.

4—The inner ring structure of the material is opened up.

5—Certain organic groupings are oxidized to more active groupings.
6—Active carbon is exposed.
7—The material is much more easily wet.
8—Porosity is greatly increased.
9—Polar groupings are formed.

After the reactions of the carbonaceous material with the treating reagent are complete, the resultant product is water washed and is ready for use. It may however be even further activated by a final treatment with superheated steam.

In the application of the novel reagent to its intended use, it may be employed in the form of a filter or as a powdered reagent added to the water ahead of the coagulation step.

Having thus described our invention, what we claim is:—

1. A reagent for use in the purification of water comprising a nitrated oxidized carbonaceous material formed by reacting a carbonaceous material selected from the group consisting of bituminous coal, anthracite coal, lignite coal, cannel coal, peat and coke with a reagent selected from the group consisting of nitric acid, nitric acid and sulfuric acid, nitric acid and orthophosphoric acid, nitrous oxide and nitrogen dioxide.

2. A reagent for use in the purification of water comprising a nitrated oxidized carbonaceous material formed by reacting a carbonaceous material selected from the group consisting of bituminous coal, anthracite coal, lignite coal, cannel coal, peat and coke with nitric acid.

3. A reagent for use in the purification of water comprising a nitrated oxidized carbonaceous material formed by reacting bituminous coal with a reagent selected from the group consisting of nitric acid, nitric acid and sulfuric acid, nitric acid and orthophosphoric acid, nitrous oxide and nitrogen dioxide.

4. A process for preparing a reagent for use in the treatment of water comprising reacting a carbonaceous material selected from the group consisting of bituminous coal, anthracite coal, lignite coal, cannel coal, peat and coke, with a reagent selected from the group consisting of nitric acid, nitric acid and sulfuric acid, nitric acid and orthophosphoric acid, nitrous oxide and nitrogen dioxide.

5. A process for preparing a reagent for use in the treatment of water comprising reacting a carbonaceous material selected from the group consisting of bituminous coal, anthracite coal, lignite coal, cannel coal, peat and coke, with nitric acid.

6. A process for preparing a reagent for use in the treatment of water comprising reacting a carbonaceous material selected from the group consisting of bituminous coal, anthracite coal, lignite coal, cannel coal, peat and coke, with a reagent selected from the group consisting of nitric acid, nitric acid and sulfuric acid, nitric acid and orthrophosphoric acid, nitrous oxide and nitrogen dioxide, and passing gas through the reacting mass to remove gaseous reaction products therefrom.

OLIVER M. URBAIN.
WILLIAM R. STEMEN.